United States Patent [19]

Hinokimoto

[11] Patent Number: 5,226,081
[45] Date of Patent: Jul. 6, 1993

[54] MULTI-CARRIER COMMUNICATION SYSTEM USING CIPHERED CARRIER BIT ASSIGNMENT INFORMATION

[75] Inventor: Shinichi Hinokimoto, Tokyo, Japan
[73] Assignee: Fujitsu Limited, Japan
[21] Appl. No.: 700,029
[22] Filed: May 14, 1991
[30] Foreign Application Priority Data

May 17, 1990 [JP] Japan .................................. 2-127606

[51] Int. Cl.$^5$ ............................................. H04K 1/10
[52] U.S. Cl. ..................................... 380/34; 342/381; 379/98
[58] Field of Search .......................... 380/34; 342/381; 379/98

[56] References Cited

U.S. PATENT DOCUMENTS

| | | | |
|---|---|---|---|
| 3,898,566 | 8/1975 | Switzer et al. ........................ | 380/34 |
| 4,438,511 | 3/1984 | Baran . | |
| 4,679,227 | 7/1987 | Hughes-Hartogs ................... | 379/98 |
| 4,731,816 | 3/1988 | Hughes-Hartogs ................... | 379/98 |
| 4,757,495 | 7/1988 | Decker et al. . | |
| 4,833,706 | 5/1989 | Hughes-Hartogs ................... | 379/98 |
| 4,893,350 | 1/1990 | Minamisono et al. .............. | 342/381 |

OTHER PUBLICATIONS

Bingham, "Multicarrier Modulation for Data Transmission: An Idea Whose Time Has Come" *IEEE Communications Magazine* May 1990, pp. 5-14.

*Primary Examiner*—David Cain
*Attorney, Agent, or Firm*—Welsh & Katz, Ltd.

[57] ABSTRACT

A multi-carrier communication system wherein a sender side apparatus and a receiver side apparatus are connected through a transmission line. The sender side apparatus contains a multi-carrier modulator for modulating data, where preset numbers of bits of the data are respectively modulated with a plurality of carriers in each cycle. The sender side apparatus transmits a training signal which is modulated by the multi-carrier modulating unit where the numbers are set equal to a predetermined maximum of the numbers, to the receiver side apparatus. The receiver side apparatus evaluates the quality of components of the training signal where the components are modulated with the respective carriers to determine the above numbers to be preset, ciphers information on the numbers, and transmits the ciphered information to the sender side apparatus. The sender side apparatus deciphers the information to obtain the determined numbers, and presets the numbers in a multi-carrier demodulator which is provided therein.

9 Claims, 10 Drawing Sheets

RECEIVER SIDE

Fig. 8B

SENDER SIDE

MULTI-CARRIER COMMUNICATION SYSTEM USING CIPHERED CARRIER BIT ASSIGNMENT INFORMATION

BACKGROUND OF THE INVENTION

1. Field of the Invention

The present invention relates to a multi-carrier communication system wherein a plurality of carriers each having a different frequency are concurrently used for transmitting data. The present invention relates, in particular, to a multi-carrier communication system wherein a provision is made for preventing wiretapping.

2. Description of the Related Art

A facsimile communication system using a public analog telephone line, is one application of the multi-carrier communication system. When the multi-carrier communication system is applied in the facsimile communication system, a plurality of carriers each having a different frequency within a voice frequency band are concurrently used for transmitting data. A certain number of data bits are assigned to each of the plurality of carriers for transmitting data. The numbers which are assigned to the respective carriers, are determined so that a predetermined error rate is expected in respective channels using the carriers in a receiver side. The numbers are determined at a beginning stage of each transmission process based on the quality of the public analog telephone line by monitoring a received signal for a noise level and distortion which are included in the received signal. The assigned numbers are informed to the sender side, and then data transmission using the assigned numbers is commenced. The techniques for determining the above assignment are disclosed in "Multicarrier Modulation for Data Transmission: An Idea Whose Time Has Come" John A. C. Bingham, IEEE Communication Magazine, May 1990, and U.S. Pat. Nos. of D. Hughes-Hartogs 4,679,227 (Jul. 7, 1987), 4,731,816 (Mar. 15, 1988), and 4,833,706 (May 23, 1989). For example, about four hundred channels can be established in a transmission band in practice, of 300 to 3400 Hz. A bit rate of 18 Kbps is realized when the quality of the transmission line is in a best condition.

On the other hand, facsimile communication systems are widely spread, and very important information is often transmitted through these facsimile communication systems. However, there is a risk of the transmitted information being wiretapped because it is easy for a corporate spy to obtain and regenerate transmitted information by wiretapping.

Although, conventionally, a cipher apparatus (cryptograph) for coding data which is to be transmitted, may be provided, the operation of coding data is complicated and therefore, a heavy load is imposed during data transmission for ciphering data. Further, and the conventional cipher apparatus is expensive.

SUMMARY OF THE INVENTION

An object of the present invention is to provide a multi-carrier communication system wherein a provision is made for preventing wiretapping by simple construction and operation and at a low cost.

According to the present invention, there is provided a multi-carrier communication system wherein a sender side apparatus and a receiver side apparatus are connected through a transmission line. The sender side apparatus comprises: a multi-carrier modulating unit for modulating each bit of data which is to be transmitted to the receiver side apparatus, with one of a plurality of carriers, to generate a multi-carrier signal containing a plurality of components corresponding to the plurality of carriers, where each of the plurality of components contains a determined number of bits of the data modulated with one of the plurality of carriers corresponding to the component, the number of the bits simultaneously modulated with each carrier in each cycle is determined in advance of transmitting the multi-carrier signal containing the data, and the determined number is preset in the multi-carrier modulating unit; a transmitting unit for transmitting the multi-carrier signal through the transmission line to the receiver side apparatus; a training signal generating unit for generating a training signal; a training signal modulating unit for modulating the training signal by using the multi-carrier modulating unit means, to generate a multi-carrier signal containing the modulated training signal, where the above determined numbers are temporarily equal to a predetermined maximum of the numbers while modulating the training signal; a bit number information receiving unit for receiving ciphered information on the numbers of the bits which are to be preset in the multi-carrier modulating unit; an information deciphering unit for deciphering the ciphered information; and a bit number presetting unit for presetting the numbers of bits in accordance with the deciphered information. The receiver side apparatus comprises: a receiving unit for receiving signals which are transmitted from the sender side apparatus; a multi-carrier demodulating unit for demodulating the multi-carrier signal which is transmitted from the sender side apparatus to regenerate the bit of the data, wherein the numbers of bits of the data which are respectively modulated with the plurality in the multi-carrier signal in each cycle, are preset therein, and demodulation is carried out based on the preset numbers; a bit number determining unit for determining the numbers of bits of the data which are to be respectively modulated with a plurality of carriers in each cycle, by evaluating the quality of the plurality of components of the multi-carrier signal containing the modulated the training signal which are received through the transmission line, a bit number ciphering unit for ciphering information on the numbers which are determined in the bit number determining unit; and a bit number information transmitting unit for transmitting the ciphered information to the sender side apparatus.

DESCRIPTION OF THE PREFERRED EMBODIMENTS

Figure 1A:
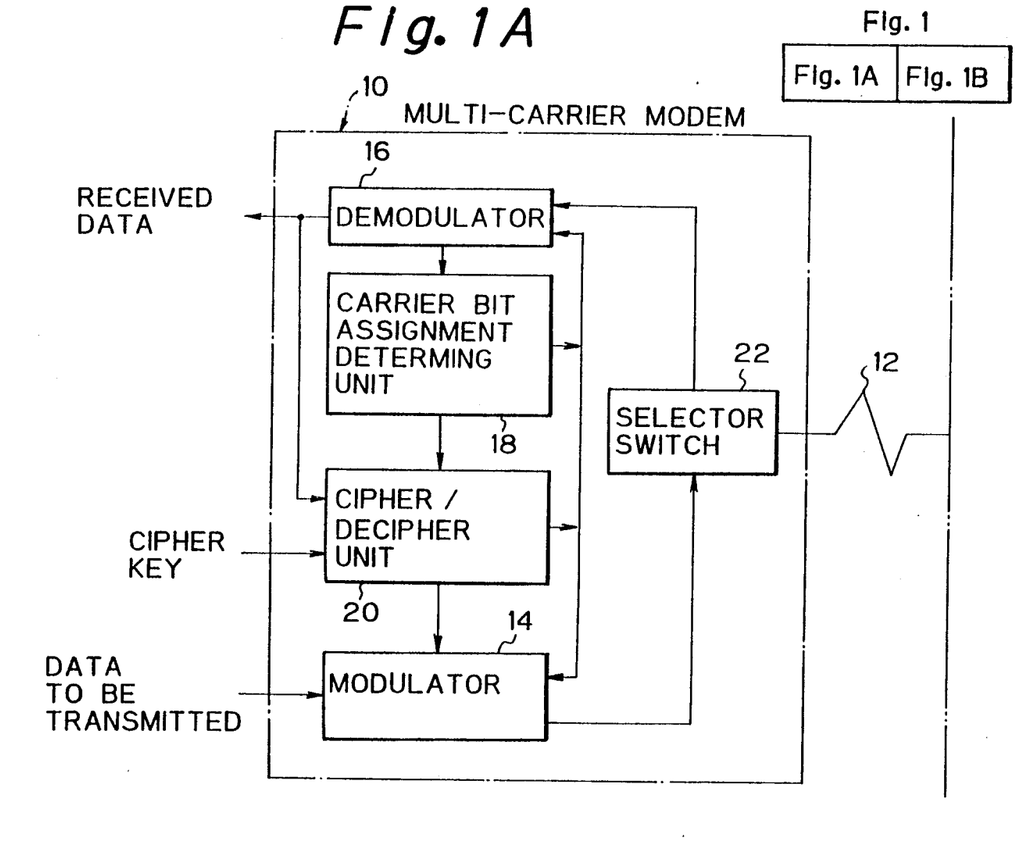
FIGS. 1a and 1b are a block diagram showing a construction of the embodiment of the present invention.
Figure 1B:
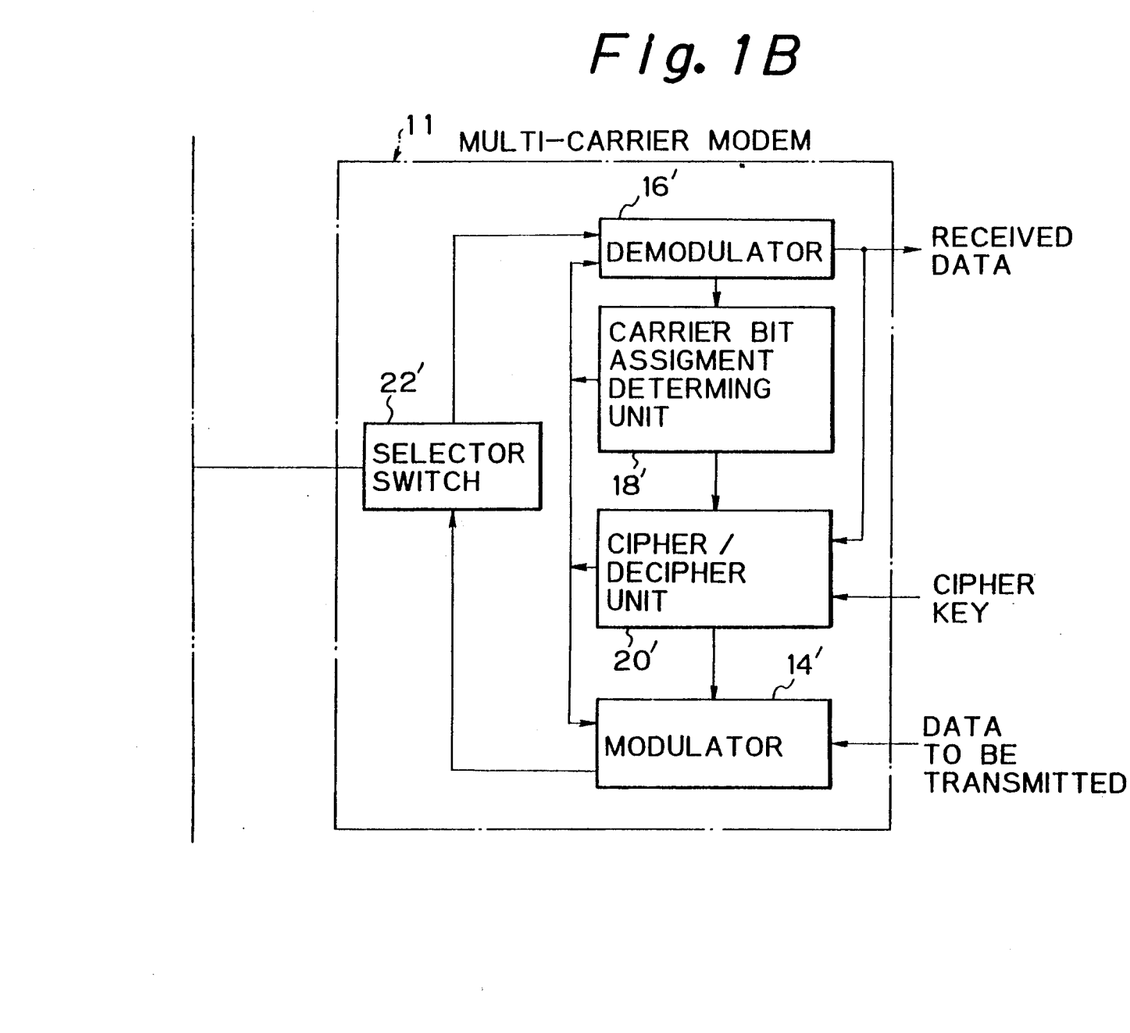

FIG. 1 is a block diagram showing a construction of the embodiment of the present invention. In FIG. 1, reference numeral 10 and 11 each denote a multi-carrier modem, 12 denotes a public analog telephone line (public analog telephone network), 14 and 14' each denote a modulator, 16 and 16' each denote a demodulator, 18 and 18' each denote a carrier bit assignment determining unit, 20 and 20' each denote a cipher/decipher unit, and 22 and 22' each denote a selector switch.

The multi-carrier modems 10 and 11 each is connected between a data processing portion and the public analog telephone line 12 in a facsimile terminal. A data signal which is to be transmitted from a facsimile terminal to another facsimile terminal through the public analog telephone line (public analog telephone network), is generated in a data processing portion in a sender side. The multi-carrier modem 10, when it is in the sender side, modulates the data signal by a plurality of carriers which are provided within a voice frequency band (300 Hz to 3.4 KHz), and are arranged so that the frequencies of the carriers are equally spaced. Generally, each bit of the data is modulated with one of the plurality of carriers, and with each of the plurality of carriers, one or more bits of data can be simultaneously modulated in each cycle, and the number of the bits simultaneously transmitted with each carrier is preset in the multi-carrier modem 10. The modulation is carried out, for example, in accordance with quadrature amplitude modulation (QAM). The signal modulated with the plurality of carriers in each cycle are summed and transmitted through the public analog telephone line (public analog telephone network) 12 to the other multi-carrier modem 11. The facsimile terminal 11, when it is in the receiver side, demodulates the above modulated signal which is transmitted from the sender side, and contains the numbers of bits of the data which are respectively modulated with the plurality of carriers. The above numbers are preset in the facsimile terminal, and the demodulation is carried out based on the preset numbers. The demodulated signal is output to a data processing portion in a facsimile terminal 11 in the receiver side.

When the facsimile terminal 10 is in the sender side, the above modulation operation is carried out in the modulator 14 in the multi-carrier modem 10, and the output of the modulator 14 is transmitted through the selector switch 22 on the public analog telephone line (public analog telephone network) 12. When the facsimile terminal 11 is in the receiver side, the above demodulation operation is carried out in the demodulator 16' in the multi-carrier modem 11, and the modulated signal which is transmitted through the public analog telephone line (public analog telephone network) 12 passes through the selector switch 22' to the demodulator 16'. The function of the selector switches 22 and 22' are each realized by a hybrid transformer.

Figure 2:
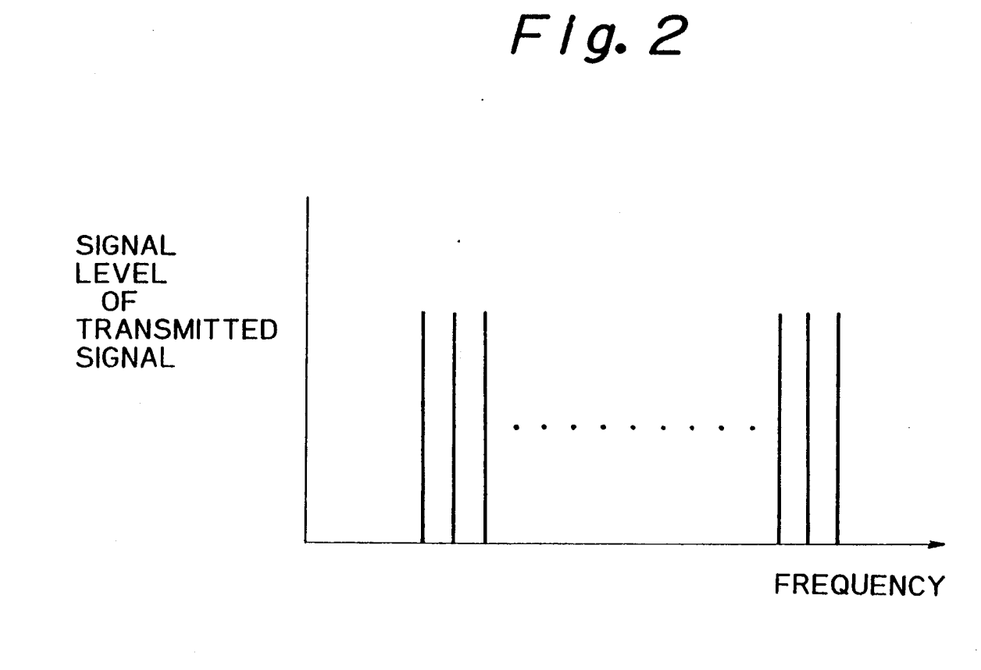
FIG. 2 shows a bit number assignment when a training signal is modulated and transmitted.
Figure 3:
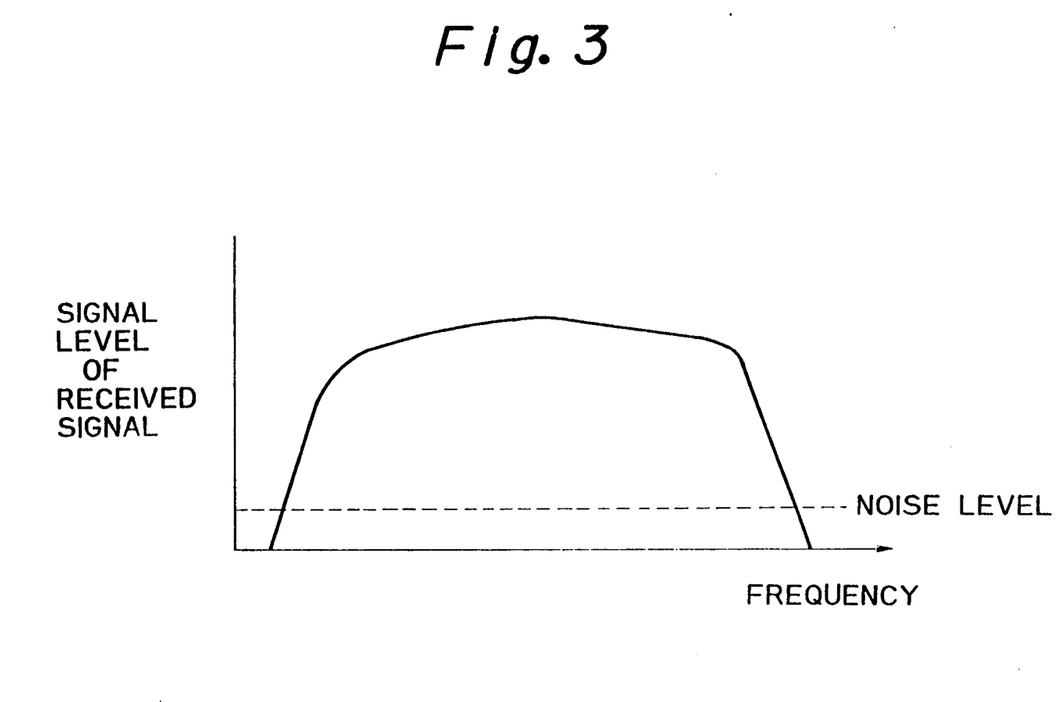
FIG. 3 is a graph showing a level of the training signal when received in the receiver side.

As explained later, before transmitting data, a training signal is transmitted from the sender side to the receiver side. The training signal is modulated with the above plurality of carriers, and the above numbers of bits preset for respective carriers are set as a predetermined maximum, as shown in FIG. 2. The modulated training signal is demodulated by the demodulator 16' in the facsimile terminal 11 in the receiver side, and the demodulated training signal is supplied to the carrier bit assignment determining unit 18'. When receiving the demodulated training signal, the carrier bit assignment determining unit 18 or 18' determines the numbers of bits of the data which the respective carriers modulate in each cycle, by evaluating the quality of a plurality of components of the demodulated training signal, where the components are respectively modulated with the plurality of carriers, so that a predetermined minimum quality is expected in the following transmission of the data signal. Generally, the signal which is transmitted through the public analog telephone line (public analog telephone network) 12 suffers from noise, attenuation, and distortion, and the noise, attenuation, and distortion vary depending on time and an established circuit (link) between the facsimile terminals. FIG. 3 shows a general tendency of the attenuation and noise level from which the transmitted signal suffers. Of course, the characteristics of the attenuation and noise level may different from the characteristics shown in FIG. 3. Therefore, the above determination of the numbers of bits which are assigned to the plurality of carriers is carried out after each establishment of a circuit (link) and before the transmission of real data signal. The operation of the determination is well-known as mentioned before, and is disclosed in "Multicarrier Modulation for Data Transmission: An Idea Whose Time Has Come" John A. C. Bingham, IEEE Communication Magazine, May 1990, and U.S. Pat. Nos. of D. Hughes-Hartogs 4,679,227 (Jul. 7, 1987), 4,731,816 (Mar. 15, 1988), and 4,833,706 (May 23, 1989).

According to the present invention, the cipher/decipher unit 20' in the facsimile terminal 11 in the receiver side ciphers information on the above numbers which are determined in the carrier bit assignment determining unit 18'. A predetermined cipher key is preset in the cipher/decipher unit 20', and the cipher key is used in the ciphering operation. An example of the ciphering operation is explained later. The ciphered information on the determined numbers is modulated by the modulator 14', and is transmitted through the selector switch 22' and the public analog telephone line (public analog telephone network) 12 to the facsimile terminal 10 in the sender side.

In the facsimile terminal 10 in the sender side, the above modulated (and ciphered) information is received through the selector switch 22, and is demodulated by the demodulator 16. The demodulated (and ciphered) information is supplied to the cipher/decipher unit 20. The cipher/decipher unit 20 deciphers the demodulated and ciphered information on the numbers to obtain the above determined numbers. The above predetermined cipher key is preset in the cipher/decipher unit 20, and the cipher key is used in the deciphering operation. It is assumed that the cipher key is predetermined between the sender side and the receiver side. The obtained numbers are set in the modulator 14 to be used in the modulation of the data signal.

Figure 4:
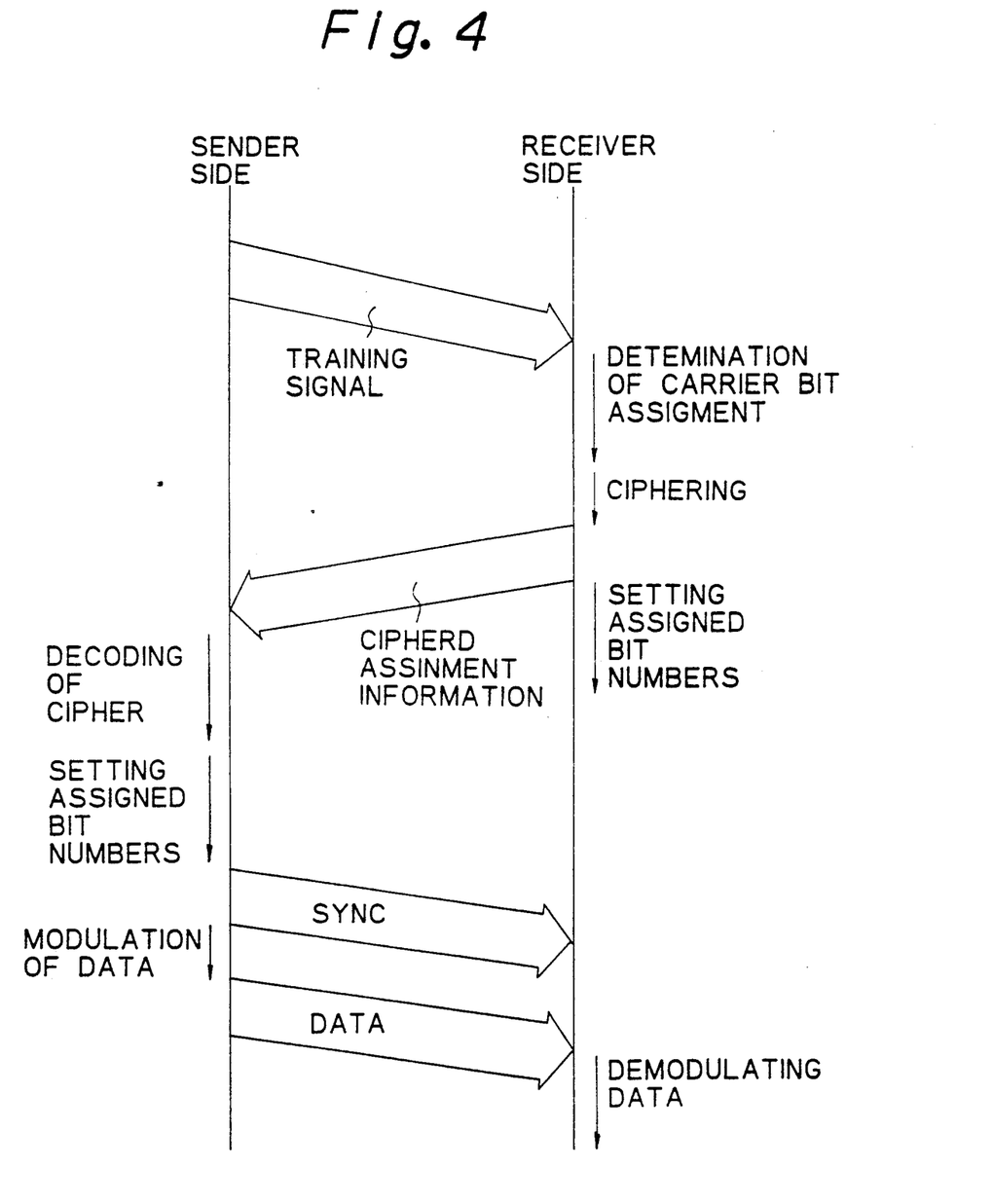
FIG. 4 shows a sequence of an operation of data transmission in the embodiment of the present invention.

FIG. 4 shows a sequence of an operation of data transmission beginning with the above operations in the present invention. After the numbers are set in the modulator 14, a synchronization pattern SYNC is transmitted from the sender side to the receiver side, and the real data signal is transmitted.

If the numbers of bits which are assigned to the plurality of carriers are unknown, regeneration (demodulation) of the data signal is impossible, and therefore, wiretapping is prevented. The ciphering operation is carried out only before the data transmission for the information on the numbers assigned to the plurality of carriers, the operation of and the construction for the ciphering is very simple, and the construction is realized with a low cost.

Figure 5:
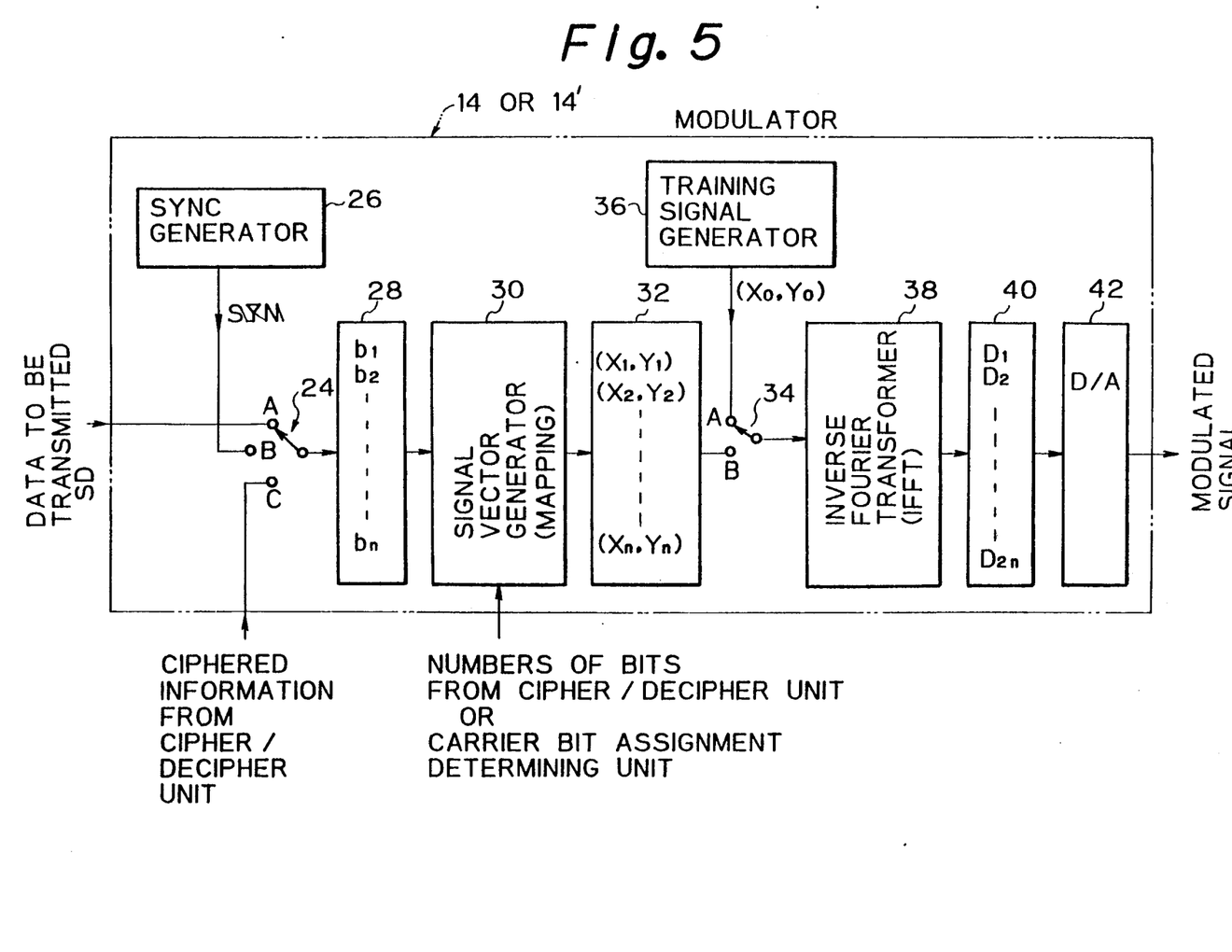
FIG. 5 is a block diagram showing a construction of the modulator in the construction of FIG. 1.

FIG. 5 is a block diagram showing a construction of the modulator in the construction of FIG. 1. In FIG. 5, reference numeral 24 denotes a selector switch, 26 denotes a synchronization signal generator, 28 denotes a data buffer, 30 denotes a signal vector generator, 32 denotes a vector buffer, 34 denotes a selector switch, 36 denotes a training signal generator, 38 denotes an inverse Fourier transformer, 40 denotes a time sequence buffer, and 42 denotes a digital to analog converter.

The selector switch 24 selects and receives at one of the three inputs, data SD which is to be transmitted, a synchronization signal SYN from the synchronization signal generator 26, and the ciphered information from the cipher/decipher unit 20 or 20' to supply the selected input to the data buffer 28. The data buffer 28 temporarily holds a predetermined number of bits bi (i=1 to n) of the above input signal, where each of b1, b2, . . . bn indicates a set of successive bits of the input signal which are to be modulated with one of the plurality of carriers in one cycle. The predetermined number corresponds to the sum of the above numbers which are assigned to the plurality of carriers, and corresponds to one cycle of multi-carrier modulation.

Each of the above set of successive bits is supplied in turn to the signal vector generator 30. The signal vector generator 30 contains a plurality of mapping circuits (not shown) respectively corresponding to the possible numbers of the bits which may be assigned to the plurality of carriers. Each of the mapping circuits converts the above set bi (i=1 to n) of successive bits into a QAM vector (a pair of coordinates) Xi, Yi (i=1 to n). One of the plurality of mapping circuits is selected for each of the plurality of carriers, and the conversion is carried out using the selected mapping circuit. For example, the number of bits of a set of the successive bits is equal to zero, the corresponding carrier is not used; when the number of bits of a set of the successive bits is equal to two, the mapping circuit having four signal points as its output is used; when the number of bits of a set of the successive bits is equal to three, the mapping circuit having 16 signal points as its output is used; when the number of bits of a set of the successive bits is equal to four, the mapping circuit having 32 signal points as its output is used; when the number of bits of a set of the successive bits is equal to five, the mapping circuit having 64 signal points as its output is used; when the number of bits of a set of the successive bits is equal to six, the mapping circuit having 128 signal points as its output is used; and when the number of bits of a set of the successive bits is equal to seven, the mapping circuit having 256 signal points as its output is used. The above selection is controlled by a controller (not shown) based on the preset numbers which are assigned to the plurality of carriers. The numbers to be preset for modulating the synchronization signal and the real data signal are supplied from the cipher/decipher unit 20 or 20', and the numbers to be preset for modulating the ciphered information on the numbers which are determined and ciphered as explained before, are supplied from the carrier bit assignment determining unit 18 or 18'. The signal vector generator 30 may contain memory to store the preset numbers therein.

The converted QAM vectors Xi, Yi (i=1 to n) are temporarily held in the vector buffer 32.

When the facsimile terminal transmits the training signal as mentioned before, the selector switch 34 selects the training signal (QAM vector) X0, Y0 as its input to supply the input to the inverse Fourier transformer 38. In this case, the QAM vector is fixed to the QAM vector X0, Y0 for all the carriers.

When the facsimile terminal transmits the above signals other than the training signal as mentioned before, the selector switch 34 selects the output of the vector buffer 30 as its input to supply the input to the inverse Fourier transformer 38.

The inverse Fourier transformer 38 generates a time series of modulated signals for one cycle of the above QAM vectors Xi, Yi (i=1 to n). For example, 512 carriers whose frequencies are equally spaced with intervals of 7.8125 Hz are arranged within a transmission band of 0 to 4 KHz, where a fundamental frequency is equal to 7.8125 Hz and the other 511 carriers are higher harmonic frequencies of the second to 512-th orders, and a time series of 1024 signal points Dj (j=1 to 2n) is generated from the above QAM vectors Xi, Yi (i=1 to n). The time series Dj (j=1 to 2n) is temporarily held in the time series buffer 40, and is converted to an analog signal in the digital to analog converter 42 to obtain a multi-carrier modulated analog signal. When transmitting the training signal, the inverse Fourier transformer 38 generates a time series of modulated signal for one cycle of the above QAM vector X0, Y0 to generate a multi-carrier modulated analog training signal through the time series buffer 40 and the digital to analog converter 42.

Figure 6:
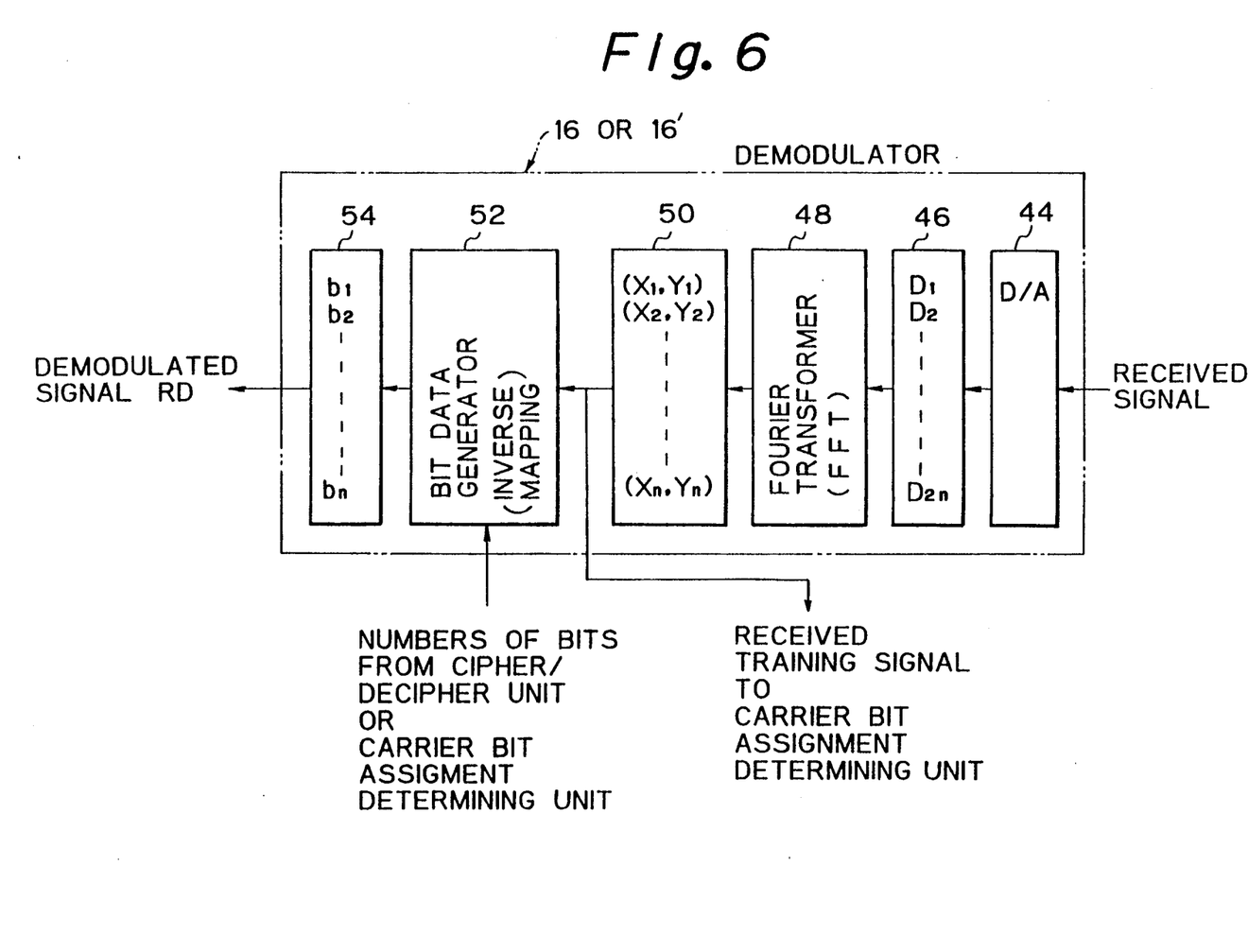
FIG. 6 is a block diagram showing a construction of the demodulator in the construction of FIG. 1.

FIG. 6 is a block diagram showing a construction of the demodulator in the construction of FIG. 1. In FIG. 6, reference numeral 44 denotes an analog to digital converter, 46 denotes a time series buffer, 48 denotes a Fourier transformer, 50 denotes a vector buffer, 52 denotes a bit data generator, and 54 denotes a data buffer.

The analog to digital converter 44 samples 1024 signal points for one cycle of the Fourier transformation from the above multi-carrier modulated analog signal which is transmitted from the sender side through the analog telephone line, to convert the above multi-carrier modulated analog signal to a digital time series Dj (j=1 to 2n), and the sampled digital time series Dj (j=1 to 2n) is temporarily held in the time series buffer 46. The Fourier transformer 48 transforms the sampled digital time series Dj (j=1 to 2n) into QAM vector components Xi, Yi (i=1 to n). The QAM vector components Xi, Yi (i=1 to n) are temporarily held in the vector buffer 50.

Each of the above QAM vectors Xi, Yi is supplied in turn to the bit data generator 52. The bit data generator 52 contains a plurality of inverse mapping circuits (not shown) respectively corresponding to the possible numbers of the bits which may be assigned to the plurality of carriers. Each of the inverse mapping circuit converts the above QAM vectors (a pair of coordinates) Xi, Yi into a set bi (i=1 to n) of successive bits of data signal. One of the plurality of inverse mapping circuits is selected for each of the plurality of carriers, and the conversion is carried out using the selected inverse mapping circuit. For example, when the number of bits of a set of the successive bits is equal to two, the inverse mapping circuit having four signal points as its input is used; when the number of bits of a set of the successive bits is equal to three, the inverse mapping circuit having 16 signal points as its input is used; when the number of bits of a set of the successive bits is equal to four, the inverse mapping circuit having 32 signal points as its input is used; when the number of bits of a set of the successive bits is equal to five, the inverse mapping circuit having 64 signal points as its input is used; when the number of bits of a set of the successive bits is equal to six, the inverse mapping circuit having 128 signal points as its input is used; and when the number of bits of a set of the successive bits is equal to seven, the inverse mapping circuit having 256 signal points as its input is used. The above selection is controlled by a controller (not shown) based on the preset numbers which are assigned to the plurality of carriers. The numbers to be preset for demodulating the synchronization signal and the real data signal are supplied from the cipher/decipher unit 20 or 20', and the numbers to be preset for modulating the ciphered information on the numbers which are determined and ciphered as explained before, are supplied from the carrier bit assignment determining unit 18 or 18'. The bit data generator 52 may contain a memory to store the preset numbers therein.

The converted set bi ($i=1$ to n) of successive bits of data signal are temporarily held in the data buffer 54, and is output as a received data signal.

When the facsimile terminal receives the training signal as mentioned before, the content of the vector buffer 50 is supplied to the carrier bit assignment determining unit 18 or 18'.

Figure 7:
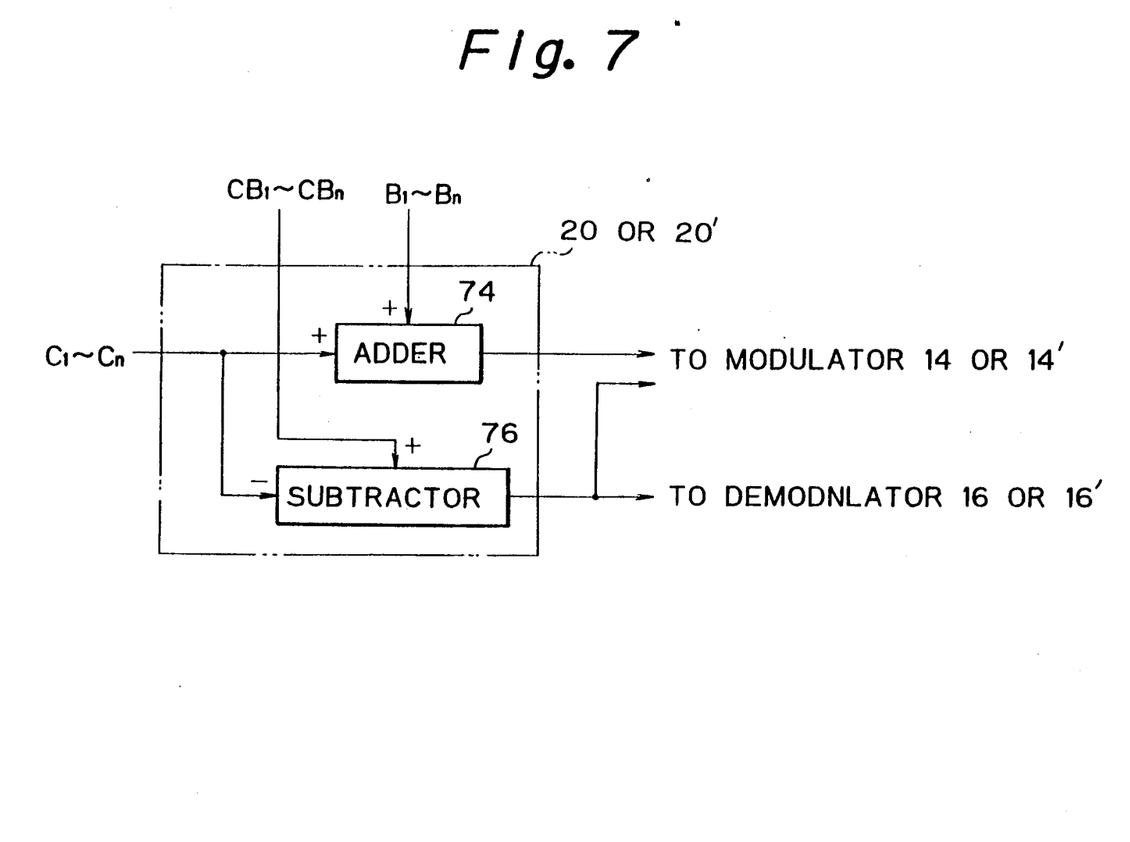
FIG. 7 is a block diagram showing a construction of the cipher/decipher unit in the construction of FIG. 1.

FIG. 7 is a block diagram showing a construction of the cipher/decipher unit 20 or 20' in the construction of FIG. 1. In FIG. 7, reference numeral 74 denotes an adder, 76 denotes a subtracter, Bi ($i=1$ to n) denote the numbers which are assigned to the plurality of carriers, Ci ($i=1$ to n) denote a set of predetermined numbers which constitute a cipher key, and CBi ($i=1$ to n) denote a set of ciphered numbers.

In the embodiment of FIG. 7, when receiving a set of numbers which are determined by the carrier bit assignment determining unit 18 or 18', the cipher/decipher unit 20 or 20' ciphers the numbers Bi ($i=1$ to n) of bits by adding each of the numbers to a corresponding one of a predetermined set of values (Ci ($i=1$ to n), cipher key) which correspond to the plurality of carriers, and the cipher/decipher unit 20 or 20' deciphers the ciphered numbers CBi ($i=1$ to n) by subtracting each of the numbers from a corresponding one of the predetermined set of values (Ci ($i=1$ to n), cipher key) which correspond to the plurality of carriers. The set of values (Ci ($i=1$ to n), cipher key) are predetermined in advance between the sender side apparatus and the receiver side apparatus. The above addition and the subtraction are carried out in the adder 74 and the subtracter 76. The set of numbers (cipher key) are preset in the adder 74 and the subtracter 76.

Figure 8A:
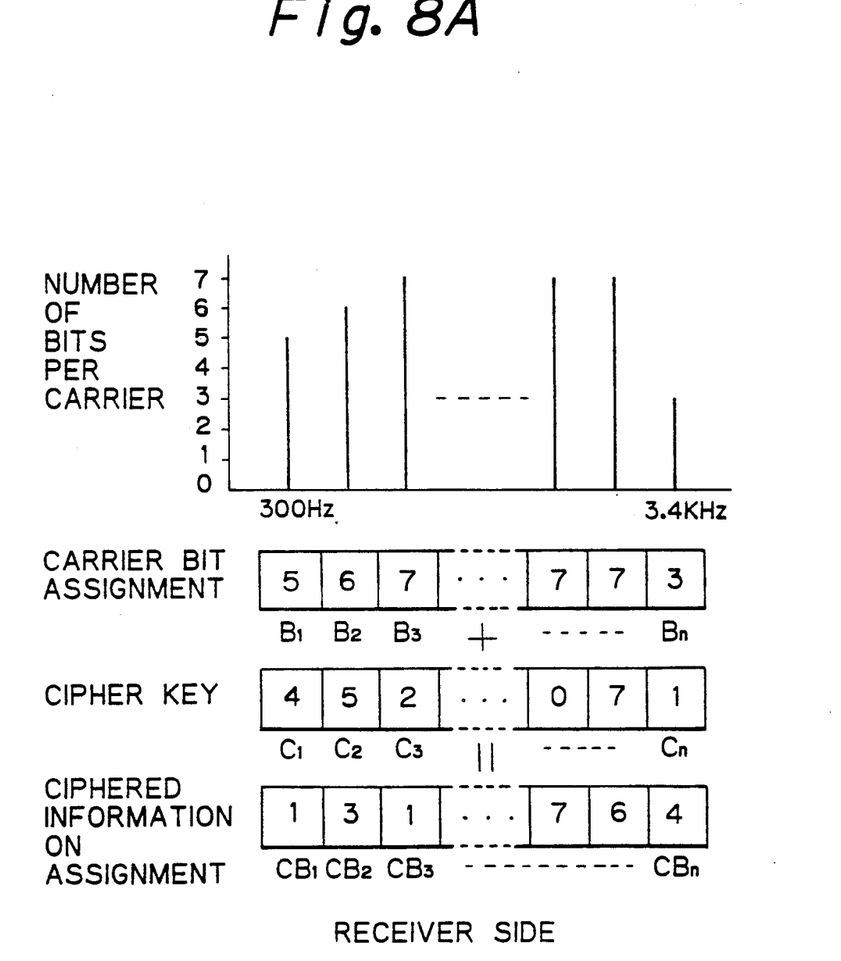
FIG. 8A shows an example of the ciphering operation in the sender side apparatus.
Figure 8B:
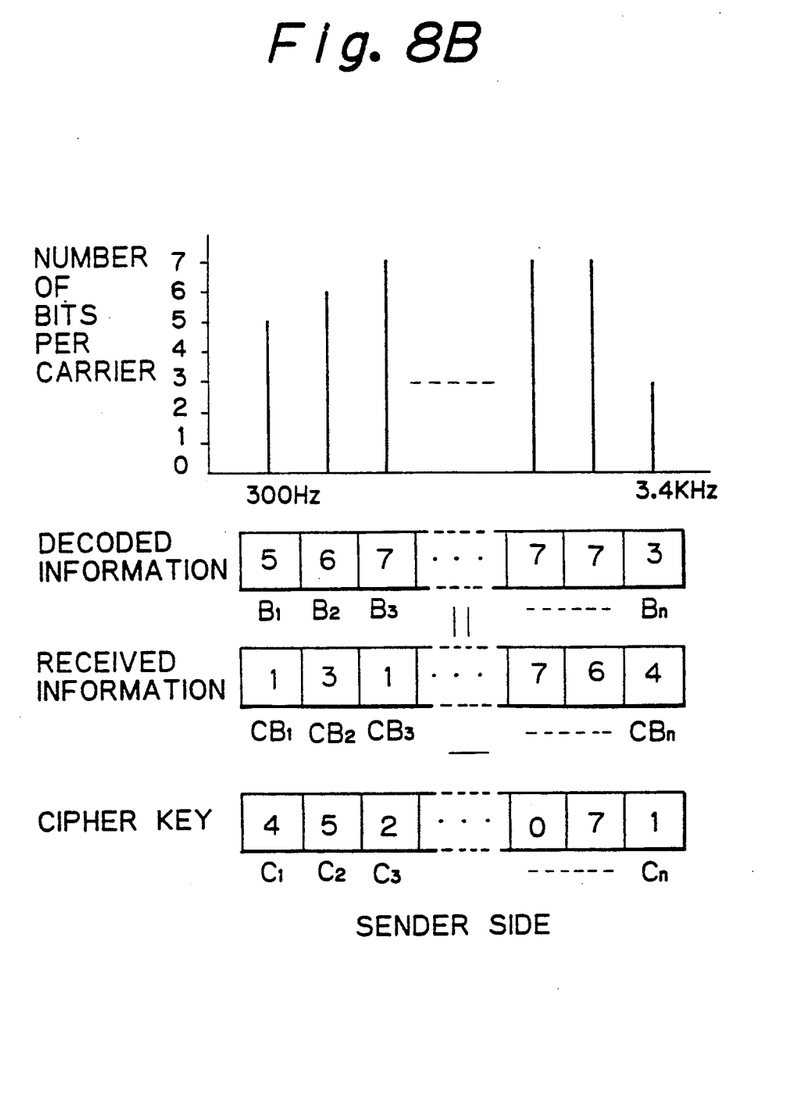
FIG. 8B shows an example of the deciphering operation in the receiver side apparatus.

FIG. 8A shows an example of the above ciphering operation in the sender side apparatus; and FIG. 8B shows an example of the above deciphering operation in the receiver side apparatus. In the example of the FIGS. 8A and 8B, the cipher $k=y$ (Ci ($i=1$ to n) is predetermined as (4, 5, 2, ... 0, 7, 1), and the numbers Bi ($i=1$ to n) which are assigned are (5, 6, 7, ... 7, 7, 3). According to the above embodiment, Since the ciphering and deciphering operations are realized by addition and subtraction, respectively, the operation and the construction are very simple.

According to the cipher/decipher unit, the assigned number corresponding to zero value in the set of the cipher key is not ciphered, and when the cipher key (Ci ($i=1$ to n) is predetermined as (0, 0, 0, ... 0, 0, 0), the ciphering operation is turned off. When the number of the zero values in the set of the cipher key is increased, the amount of calculation for ciphering and deciphering is reduced.

In addition, the cipher rate can be determined by the number of carriers for which the assigned numbers of bits are ciphered, i.e., the number of non-zero values in the set of values which constitute the cipher key. When each of the assigned numbers is represented by a number of modulo m where m is an integer, and the number of non-zero values in the set of values which constitute the cipher key is denoted by x, the cipher rate is determined as $1/m^x$. Therefore, the number x should be predetermined so that the above determined is more than a desired value of the cipher rate. For example, when $m=8$ and $x=12$, the cipher rate is estimated about $0.15 \times 10^{-12}$.

In the above embodiment, the above operations of the carrier bit assignment determining unit 18 or 18' and the aforementioned controller is realized by software on the microcomputer which is generally provided in recent facsimile terminals.

I claim:

1. A multi-carrier communication system wherein a sender side apparatus and a receiver side apparatus are connected through a transmission line,
   said sender side apparatus comprising:
   multi-carrier modulating means for modulating each bit of data which is to be transmitted to the receiver side apparatus, with one of a plurality of carriers, to generate a multi-carrier signal containing a plurality of components corresponding to the plurality of carriers, where each of the plurality of components contains a determined number of bits of the data modulated with one of the plurality of carriers corresponding to the component, the number of the bits simultaneously modulated with each carrier in each cycle is determined in advance of transmitting the multi-carrier signal containing the data, and the determined number if preset in the multi-carrier modulating unit;
   transmitting means for transmitting the multi-carrier signal through said transmission line to said receiver side apparatus;
   training signal generating means for generating a training signal;
   training signal modulating means for modulating said training signal by using said multi-carrier modulating means, to generate a multi-carrier signal containing the modulated training signal;
   bit number information receiving means for receiving ciphered information on said numbers of the bits which are to be preset in said multi-carrier modulating means;
   information deciphering means for deciphering said ciphered information; and
   bit number presetting means for presetting said numbers of bits in accordance with said deciphered information;
   said receiver side apparatus comprising:

receiving means for receiving the multi-carrier signal which is transmitted from said sender side apparatus;

multi-carrier demodulating means for demodulating the signal which is transmitted from the sender side apparatus, to regenerate the bit of the data, wherein the numbers of bits of the data which are respectively modulated with a plurality of carriers in each cycle, are preset therein, and the demodulation is carried out based on the present numbers;

bit number determining means for determining the numbers of bits of the data which are to be respectively modulated with the plurality of carriers in the multi-carrier signal in each cycle, by evaluating the quality of the plurality of components of the multi-carrier signal containing the modulated training signal which are received through said transmission line;

bit number ciphering means for ciphering information on said numbers which are determined in said bit number determining means; and bit number information transmitting means for transmitting said ciphered information to said sender side apparatus.

2. A multi-carrier communication system according to claim 1, wherein said bit number ciphering means ciphers said respective numbers.

3. A multi-carrier communication system according to claim 1, wherein said bit number ciphering means ciphers only a part of said numbers respectively, where the part is determined so that a desired cipher rate is obtained.

4. A multi-carrier communication system according to claim 1, wherein said training signal modulating means modulates said training signal by using said multi-carrier modulating means where said numbers are set equal to a predetermined maximum of the numbers.

5. A multi-carrier communication system according to claim 1, wherein said multi-carrier modulating means modulates said one or more bits of the data with each of the carriers in accordance with the quadrature amplitude modulation.

6. A multi-carrier communication system according to claim 1, wherein said bit number ciphering means ciphers said numbers of bits by adding each of the numbers to a corresponding one of a predetermined set of values which correspond to the plurality of carriers, and said set of values are predetermined in advance between said sender side apparatus and the receiver side apparatus.

7. A multi-carrier communication system according to claim 6, wherein said predetermined set of numbers correspond to the plurality of carriers, and are predetermined in advance between said sender side apparatus and the receiver side apparatus.

8. A sender side apparatus which is to be used in a multi-carrier communication system, comprising:

multi-carrier modulating means for modulating each bit of data, with one of a plurality of carriers, to generate a multi-carrier signal containing a plurality of components corresponding to the plurality of carriers, where each of the plurality of components contains a determined number of bits of the data modulated with one of the plurality of carriers corresponding to the component, the number of the bits simultaneously modulated with each carrier in each cycle is determined in advance of transmitting the multi-carrier signal containing the data, and the determined number is preset in the multi-carrier modulating unit;

transmitting means for transmitting the multi-carrier signal;

training signal generating means for generating a training signal;

training signal modulating means for modulating said training signal by using said multi-carrier modulating means, to generate a multi-carrier signal containing the modulated training signal;

bit number information receiving means for receiving ciphered information on said numbers of the bits which are to be preset in said multi-carrier modulating means;

information deciphering means for deciphering said ciphered information; and bit number presetting means for presetting said numbers of bits in accordance with said deciphered information.

9. A receiver side apparatus which is to be used in a multi-carrier communication system, comprising:

receiving means for receiving a multi-carrier signal containing a plurality of components corresponding to a plurality of carriers, and in each component, one or more bits of the data are modulated with one of the plurality of carriers corresponding to the component;

multi-carrier demodulating means for demodulating the received multi-carrier signal to regenerate the bits of the data, wherein certain numbers of bits of the data which are respectively modulated with the plurality of carriers in each cycle, are preset therein, and the demodulation is carried out based on the preset numbers;

bit number determining means for determining the numbers of bits of the data which are to be respectively modulated with the plurality of carriers in the multi-carrier signal in each cycle, by evaluating the quality of a plurality of components of the multi-carrier signal containing the modulated training signal when the training signal is received;

bit number ciphering means for ciphering information on the numbers which are determined in said bit number determining means; and bit number information transmitting means for transmitting externally said ciphered information.

* * * * *